(Model.) 2 Sheets—Sheet 1.
T. A. HEWARD & C. J. EVERHARD.
BARREL PAINTING MACHINE.
No. 249,935. Patented Nov. 22, 1881.
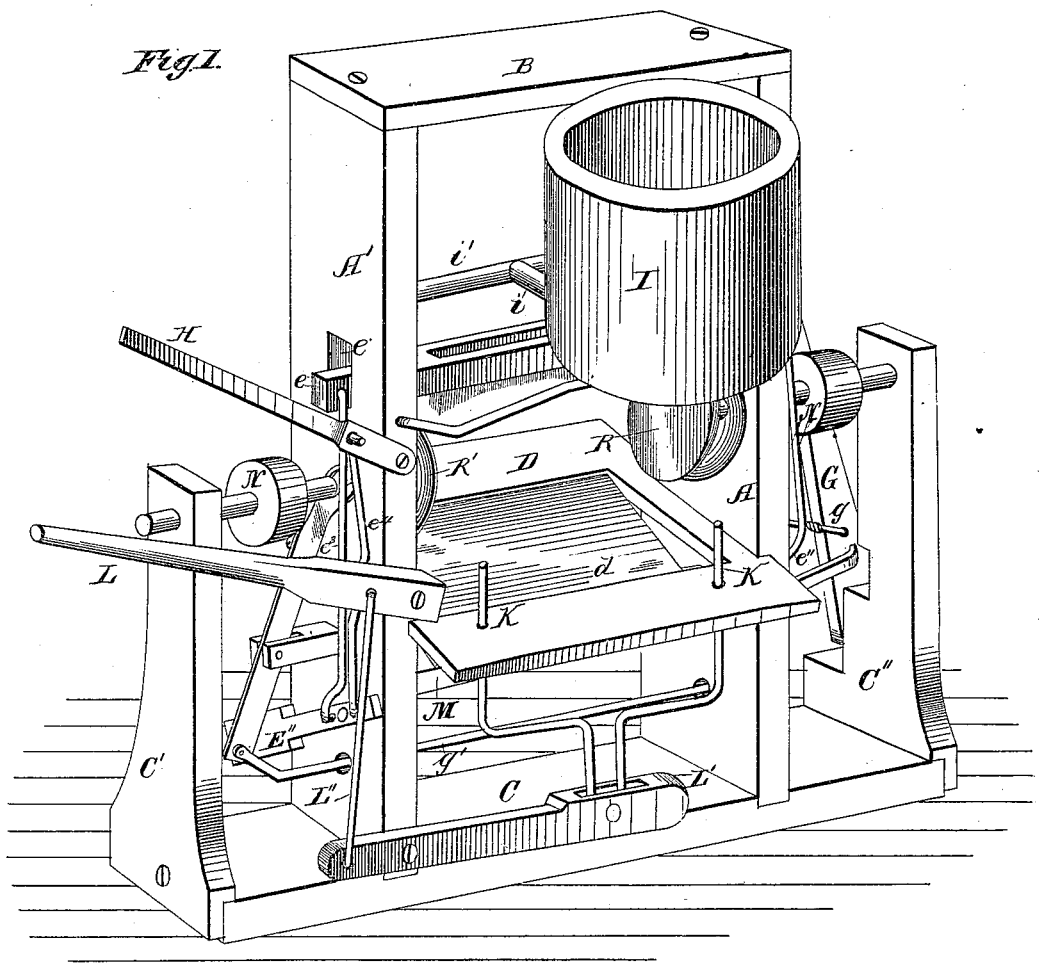
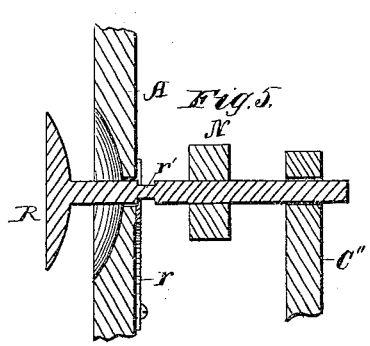
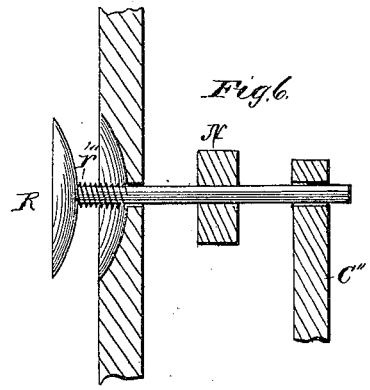
Witnesses
Wm. Reid
D. L. Lewis
Inventors,
T. A. Heward and
Chas. J. Everhard
per Hallock & Hallock
attys

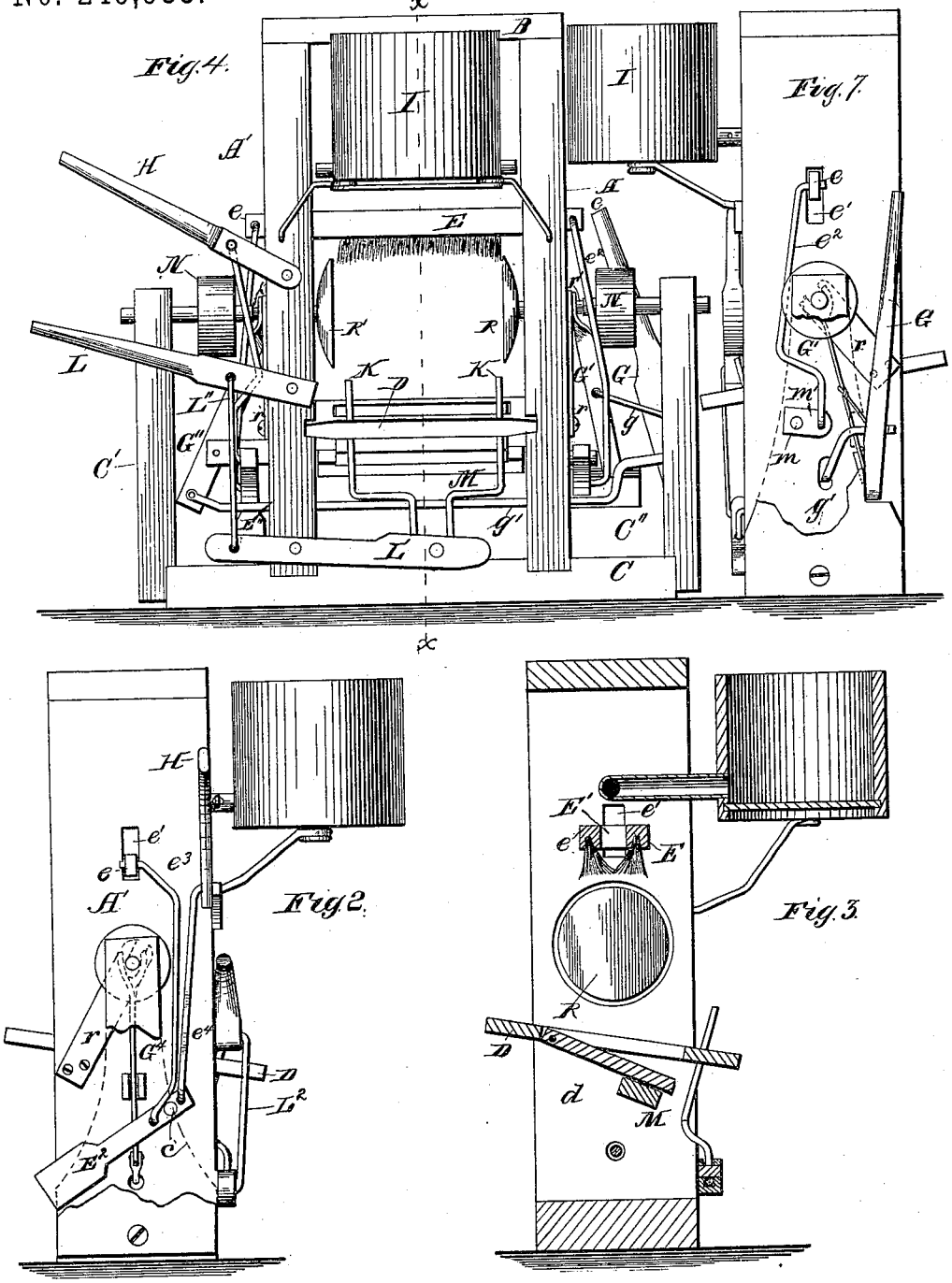

UNITED STATES PATENT OFFICE.

THOMAS A. HEWARD, OF CLEVELAND, AND CHARLES J. EVERHARD, OF CANTON, OHIO.

BARREL-PAINTING MACHINE.

SPECIFICATION forming part of Letters Patent No. 249,935, dated November 22, 1881.

Application filed December 13, 1880. (Model.)

*To all whom it may concern:*

Be it known that we, THOMAS A. HEWARD and CHARLES J. EVERHARD, of Cleveland, Ohio, and Canton, Ohio, respectively, have invented a new and useful Improvement in Barrel-Painting-Machines; and we do hereby declare that the following is a full, clear, and exact description thereof, reference being had to the accompanying drawings, and the letters or figures of reference marked thereon.

Our invention relates to machines for painting barrels. The object is to produce a machine that will accomplish the result in a better and cheaper manner; and the nature of it consists of new and improved appliances, as hereinafter specified, and pointed out in the claims, whereby the object is accomplished.

In the drawings, Figure 1 represents a perspective view of our improved machine; Fig. 2, a side elevation of stanchion A and accompanying parts; Fig. 3, a vertical section on line $xx$, Fig. 4; Fig. 4, a front elevation; Fig. 5, a detail view of one of the clamps; Fig. 6, a modification of the manner of attaching the spring; Fig. 7, a side elevation of stanchion A, showing lever G and other parts for operating the machine.

A, A′, B, and C represent the frame-work of our machine; D, an inclined plane; R R′, revolving clamps; G, a hand-lever for operating the rods and levers which reciprocate clamps R R′; E, a brush; H, a hand-lever for operating the device which moves the brush; I, a reservoir for supplying paint to the brush; K, a stop having levers L L′ and rod L″.

The frame-work may be made of any suitable material, wood being preferred. The base C is extended some distance beyond stanchions A A′, and has attached to its ends stanchions C′ C″, which support the shaft of revolving clamps R R′. The stanchions A A′ are grooved obliquely on the inner sides about one-third of the way from the bottom to receive a flooring forming inclined plane D. This plane is provided with a door, $d$, hinged near its upper end, and supported at its lower end by a cam-bar or rock-shaft, M. This bar or rock-shaft is journaled in stanchions A A′, and one end, $m$, is attached to a crank, $m'$, which is connected to the brush by means of a rod, for a purpose that will hereinafter be set forth.

The revolving clamps R R′ are button-shaped disks, the convex faces of which fit in corresponding depressions in stanchions A A′. Clamp R is provided with a shaft, which passes through holes in stanchion A and extends to stanchion C″, to which it is attached in any suitable manner. On this shaft is keyed a pulley, N. Between this pulley and clamp R, and just outside of stanchion A, is a cylindrical groove, $r'$, which serves as a bearing-face for the forked ends of lever G′. Clamp R′ is attached to the opposite stanchion in the same manner, and is provided with a corresponding pulley and groove, $r''$, the latter serving as a bearing for lever G″. Levers G′ G″, in combination with levers G and rods $g\,g'$, reciprocate the clamps. Rod $g'$ passes under the inclined plane and connects levers G and G″. Rod $g$ connects levers G and G′. To assist levers G′ and G″ to force the clamps toward each other, a bar-spring, $r$, is attached by one end to the stanchion and the other or free end rests in groove $r'$.

If desired, a coiled spring may be substituted, (see $r'''$, Fig. 6.)

E represents an oblong brush having arms $e$ extending through slots $e'$ in the stanchions A A′. If desired, springs may be placed between the under side of the brush and the bottom of the slots to assist in elevating the former when not in use. In the center of the brush is an oblong slot, E′, around which are arranged bristles formed in two parallel rows, and having their free ends meeting to prevent the paint from falling through the opening upon the barrel below, and also to form a greater painting-surface.

To each arm is attached a rod, $e^2\,e^3$. Rod $e^2$ is attached at its lower end to crank $m'$, and rod $e^3$ is attached to counter-balance E″, which is pivoted at $e$ to stanchion A′. From the short arm of counter-balance E″ a rod, $e^4$, extends upwardly to a lever, H, pivoted to stanchion A′. By depressing this lever, rod $e^4$ forces down the short arm of counter-balance E″ and lifts the long arm, which elevates rod $e^3$, brush E in slot $e'$, and rod $e^2$ on the opposite side.

Rod $e^2$ lifts crank $m'$ and turns cam-bar or rock-shaft M, which closes door $d$. The reverse motion forces the brush downwardly and turns the cam-bar so that door $d$ can fall below plane D.

We do not confine ourselves to the form of brush described, as it is obvious that other forms may be used. For example, a revolving cylindrical brush could be substituted for the brush shown. In such a case, however, an inclined plate should be placed below pipe $i'$ and above or in contact with the brush, to allow the paint to flow thereon.

I represents the reservoir, which may be placed in any suitable position upon the frame. A pipe, $i$, provided with a stop-cock is attached to the reservoir at a suitable point. At the other end is attached a perforated pipe, $i'$, which lies parallel to the oblong slot in brush E, for an obvious purpose.

At the end of inclined plane D is placed a stop, K, supported at its base by a lever, L', pivoted to stanchion A'. Above this lever another lever, L, is pivoted to the stanchion, and is connected to the former by a rod, L''. By lifting lever L stop K is depressed. A reverse motion of the lever elevates the stop.

Operation: The machine should be placed at the bottom of a chute, down which the barrel rolls, the inclined plane being on the same plane as the bottom of the chute. To receive a barrel the parts of the machine should be placed as follows: The clamps R R' should be drawn back into the recesses, (shown in Fig. 5,) the brush elevated, door $d$ closed, and the stop elevated. A barrel is allowed to run down the inclined plane D until it comes in contact with the arms of stop K. The handle of lever G is then pushed toward stanchion A. This movement of the lever by means of rod $g$ forces the long arm of lever G' against the shoulder of bearing $r'$ and pushes clamp R against one head of the barrel, and rod $g'$ forces the long arm of lever G'' against shoulder of bearing $r''$ upon the other shaft, and pushes clamp R' against the other head. Springs $r$ also assist in this movement. At the same moment lever H is drawn downwardly. This movement tilts counter-balance E'', which draws down brush E by means of rod $e^3$. Rod $e^2$ upon stanchion A turns crank $m'$, which partly revolves cam-bar M and allows door $d$ to fall. The barrel is now suspended between the revolving clamps and turned in contact with brush E. When the barrel has been turned a sufficient number of times lever G is drawn away from the stanchion. This movement loosens the hold on clamps R R' and allows the barrel to fall. At the same time lever H should be dropped, so that the counter-balance will elevate the brush by means of rod $e^3$, and the door $d$, by turning cam-bar rock-shaft M, by means of rod $e^2$ and crank $m'$. Lever L should then be lifted, so as to lower stop K and allow the barrel to pass to a machine for painting its heads. Lever L should then be dropped and the machine will be ready for another barrel.

What we claim as our invention is—

1. A barrel-painting machine having revolving clamps, located substantially as described, for the purpose of catching and revolving barrels, in combination with a brush attached to the frame-work, substantially as set forth and described.

2. A barrel-painting machine having revolving clamps provided with springs for forcing said clamps against a barrel, in combination with a brush attached to the frame-work of the machine, substantially in the manner described.

3. A barrel-painting machine having revolving clamps, in combination with a compound lever for operating or withdrawing the clamps from a barrel, and a brush attached to the frame-work of the machine, substantially in the manner described.

4. A barrel-painting machine having revolving clamps provided with springs for forcing the clamps toward each other, in combination with a compound lever for reversing the action of the springs, and a brush attached to the frame-work of the machine, substantially in the manner described.

5. In a barrel-painting machine, the combination of revolving clamps having springs with a compound lever for reversing the action of the springs, a brush arranged above, and a gravity-door below the clamps, substantially as set forth.

6. In a barrel-painting machine, the combination of revolving clamps having springs with a compound lever for reversing the action of the springs, a brush arranged above, a gravity-door below the clamps, and a cam-bar or rock-shaft placed below the door, for the purposes set forth.

7. In a barrel-painting machine, the combination of revolving clamps having springs with a compound lever for reversing the action of the springs, a brush arranged above and a gravity-door below the clamps, the latter operated by a cam-bar or rock-shaft attached to a counter-balance, substantially in the manner described.

8. In a barrel-painting machine, the combination of revolving clamps having springs with a compound lever for reversing the action of the spring, a brush arranged above and a gravity-door below said clamps, said door being operated by a cam-bar or rock-shaft attached to a counter-balance, which is connected to the operating-lever by a rod or rods, substantially in the manner described.

9. In a barrel-painting machine, the combination of revolving clamps having springs with a compound lever for reversing the action of the spring, a brush arranged above and a gravity-door below the clamps, said door being operated by a cam-bar or rock-shaft attached to a counter-balance, which is connected to the operating-lever and to the brush by rods, and all combined substantially as described.

10. In a barrel-painting machine, the combination of revolving clamps having springs with a compound lever for reversing the action of the spring, a brush arranged above and a gravity-door below said clamps, said door being operated by a cam-bar or rock-shaft attached to a counter-balance, which is connected to the operating-lever and to the brush by means of rods, and a movable stop at the end of the inclined plane, substantially as described.

11. In a barrel-painting machine, the combination of a gravity-door arranged in an inclined plane with a cam-bar or rock-shaft, substantially as set forth.

12. In a barrel-painting machine, the combination of a gravity-door arranged in an inclined plane with a cam-bar or rock-shaft attached to a counter-balance, which is connected to the operating-lever by a compound lever, substantially as described.

13. A barrel-painting machine having a brush provided with a longitudinal slot, for the purpose described, in combination with the frame-work of the machine, and a paint-reservoir located above the brush, substantially in the manner described.

14. In a barrel-painting machine, a brush having its ends resting upon springs placed in slots in the frame-work, in combination with a rod attached to a counter balance, as and for the purpose set forth.

15. A barrel-painting machine having a brush provided with extensions $e$, in combination with slots $e'$ in stanchions A A', and a series of rods and levers for operating the same, substantially in the manner described.

16. A barrel-painting machine having a brush provided with extensions $e$, in combination with slots $e'$ in stanchions A A', levers for operating it, and a paint-reservoir located above the brush, substantially in the manner described.

In testimony that we claim the foregoing we have hereunto set our hands this 8th day of December, 1880.

THOMAS A. HEWARD.
CHARLES J. EVERHARD.

Witnesses:
J. P. GAVIN,
M. F. HALLECK.